(12) United States Patent
Taylor

(10) Patent No.: US 7,493,852 B2
(45) Date of Patent: Feb. 24, 2009

(54) SHELLER AND METHOD OF USE THEREOF

(76) Inventor: George Taylor, 228 E. Broad St., Norman Park, GA (US) 31771

( * ) Notice: Subject to any disclaimer, the term of this patent is extended or adjusted under 35 U.S.C. 154(b) by 666 days.

(21) Appl. No.: 11/156,189

(22) Filed: Jun. 17, 2005

(65) Prior Publication Data

US 2007/0004480 A1    Jan. 4, 2007

(51) Int. Cl.
*A23N 5/00* (2006.01)
*A23L 1/10* (2006.01)

(52) U.S. Cl. .......................... 99/568; 426/482

(58) Field of Classification Search ........... 99/567–583, 99/658, 600–605; 426/481–483; 460/142
See application file for complete search history.

(56) References Cited

U.S. PATENT DOCUMENTS

| | | |
|---|---|---|
| 457,538 A | 8/1891 | Moulton |
| 527,954 A | 10/1894 | Empson |
| 773,858 A | 11/1904 | Empson |
| 854,443 A | 5/1907 | Voorhees et al. |
| 957,443 A | 5/1910 | Scott |
| 1,072,176 A | 9/1913 | Scott |
| 1,202,486 A | 10/1916 | Coil |
| 1,340,607 A | 5/1920 | Hamachek |
| 1,361,051 A | 12/1920 | Hamachek |
| 1,725,938 A | 8/1929 | Ryder |
| 2,193,530 A | 3/1940 | Cottengim |
| 2,633,852 A | 4/1953 | Lupton |
| 2,865,378 A | 12/1958 | Carmichael, Jr. |
| 2,910,070 A | 10/1959 | Greedy et al. |
| 3,087,499 A | 4/1963 | Carmichael, Jr. et al. |
| 3,240,211 A | 3/1966 | Borasco et al. |
| 3,574,914 A * | 4/1971 | Carter ...................... 29/890.14 |
| 4,024,877 A | 5/1977 | Welborn |
| 4,052,992 A | 10/1977 | Taylor |
| 4,066,087 A | 1/1978 | Rodgers |
| 4,137,924 A | 2/1979 | White |
| 4,597,977 A | 7/1986 | Brown |
| 5,162,021 A | 11/1992 | Welborn |

* cited by examiner

*Primary Examiner*—Sang Y Paik
(74) *Attorney, Agent, or Firm*—Williamson Intellectual Property Law, LLC; Thomas R. Williamson, III

(57) ABSTRACT

A sheller for vegetables and fruits, particularly for legumes, having a rotatable drum with baffle plates having openings formed therethrough. The baffle plates are disposed such that the openings thereof are radially oriented opposite from one another to control dwell time of legumes in the drum.

16 Claims, 3 Drawing Sheets

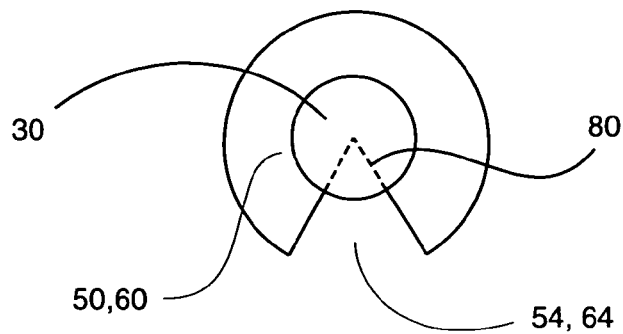
FIG. 2
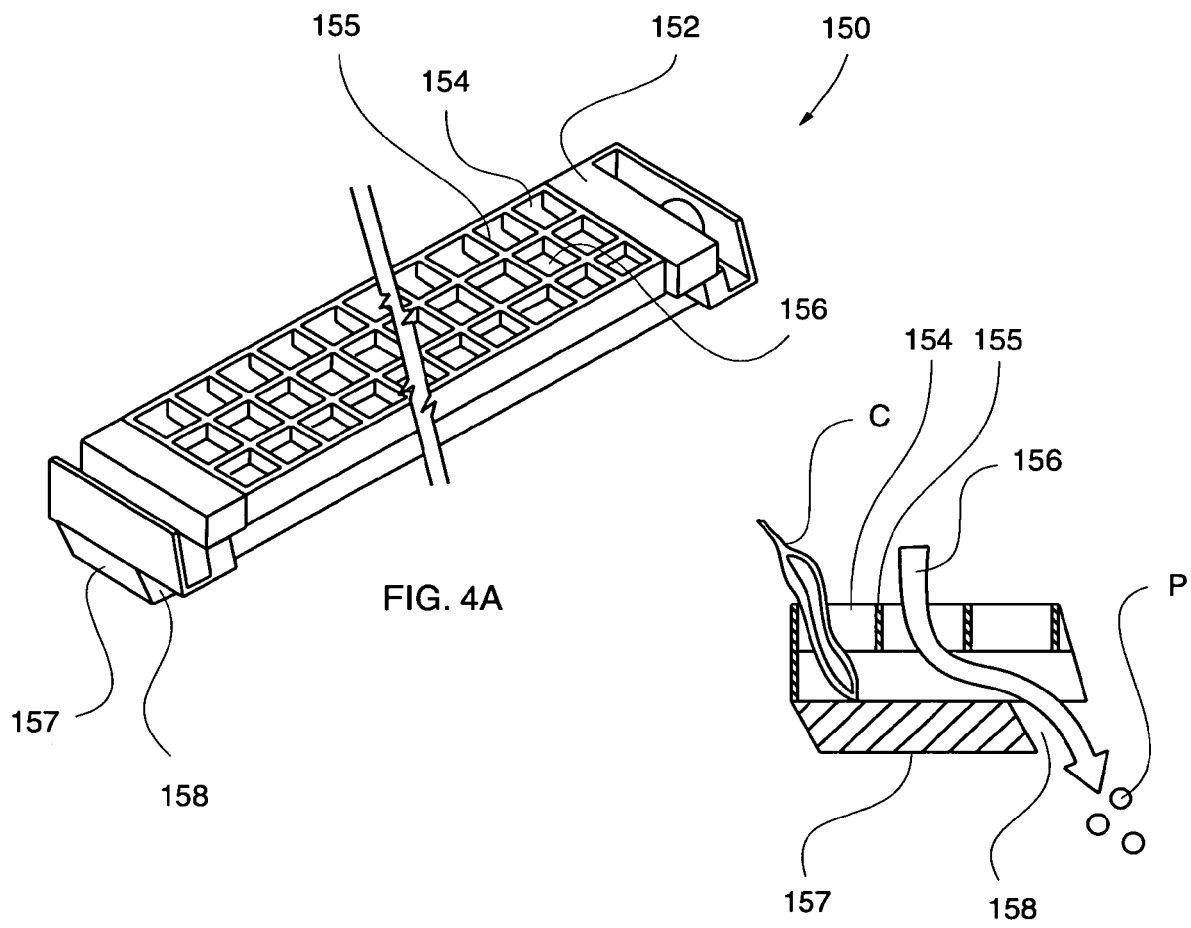
FIG. 4A
FIG. 4B

SHELLER AND METHOD OF USE THEREOF

TECHNICAL FIELD

The present invention relates generally to shelling apparatuses and methods, and more specifically to a legume sheller and method of use thereof, wherein the legume sheller comprises a baffled drum utilized for removal and separation of shells or pods from leguminous vegetables.

BACKGROUND OF THE INVENTION

Many plant seeds or fruits, including peas, beans and nuts, require the removal of an exterior protective pod or shell prior to consumption. The term "unshelled" herein refers to legumes and nuts in their natural state; that is, when the legume or nut is still within its hull, pod or shell, wherein the empty hull, pod or shell is typically called "chaff". As such, the term "shelled" herein refers to a legume or nut after its hull, pod or shell has been removed.

While removal of the pod or shell may be accomplished by hand, mechanical means provide for a reduction in labor, and often, an improvement in yield. Accordingly, various devices have been utilized to facilitate the removal of a hull, pod or shell by processing a bulk load of unshelled seeds and/or fruit, wherein the inner edible seeds and/or fruit portions are separated and removed from the outer inedible shell portions.

Removal of the pod/hull from legumes is particularly difficult because of the often soft composition of the pea, bean, or other legume. Therefore, devices have been developed to stroke the podded legume at a low rate of impact to remove the outer pod, hull or shell. In many such devices, legumes are rotated in a drum, wherein the pod impacts against paddles or other objects, and wherein the (pea or bean) legume exits the drum surface, while the chaff passes through the bore of the drum. Such rotating drum devices allow for flow-through of material over a period of time, with the legume dropping out through a screen or similar mechanism around the peripheral shell of the drum, while the chaff migrates through the drum and exits at one end thereof.

In such rotating drum shellers, selection of a suitable dwell time in the drum is important to improve yield. Too short a time, and whole pods will migrate through and exit the drum end, thereby reducing yield. Too long a time in the drum, and insufficient material will pass through the device in a given time to render it economically practical, and, further, the legume may suffer damage from repeated processing. Accordingly, baffle plates are often installed within the drum to control the flow of material through the drum.

One such existing baffle plate is fully circular but of a lesser diameter than the inner diameter of the drum, so as to provide a gap between the peripheral edge of the baffle and the inner drum wall. As such, unshelled legumes and chaff are delayed in transit, passing only through the gap. However, because unshelled or podded legumes will tend to flow to the outside of the baffle due to gravity and/or centrifugal force, such unshelled legumes are free to pass through the gap without adequate dwell time within the drum; thereby, providing proper removal of the hull, pod or shell.

Baffle partitions that fill the entire drum diameter have also been utilized to reduce the size of the drum for use with smaller loads. Unfortunately, such devices block the passage of the chaff out of the drum and, thus, defeat the ability to utilize the drum as a continuous-feed, flow-through device.

Therefore, it is readily apparent that there is a need for a sheller and method of use thereof, wherein the sheller adequately provides for flow through a drum, while selectively controlling dwell time.

BRIEF SUMMARY OF THE INVENTION

Briefly described, in a preferred embodiment, the present invention overcomes the above-mentioned disadvantages and meets the recognized need for such a device by providing a sheller and method of use thereof, wherein the sheller comprises a drum having baffles therein that extend to the full diameter of the drum, and wherein selected baffles have a truncated pie-shaped section removed from their periphery. The removed truncated pie sections each provide an opening of sufficient size to enable passage of legumes and chaff therethrough at a selected rate. The baffle plates are axially displaced on a tine carrier within the drum and the openings of separate baffles are disposed approximately diametrically opposite each other. It will be recognized by those skilled in the art that shapes other than truncated pie shapes could be utilized, so long as they provide sufficient open area to restrict passage of unshelled legumes and permit passage of chaff after a suitable dwell period.

The drum is slightly inclined downward from inlet to outlet end to permit flow therethrough. Staggering the baffle openings such that the truncated pie-shaped cutouts are at approximately diametrically opposite from one another, permits the rapid flow of chaff therethrough, while restricting passage of unshelled legumes flowing through the drum; thereby, retaining the unshelled legumes within the chambers formed between the baffles for an adequate selected dwell time to permit removal of the shell from the legume. By retaining the unshelled legumes, while permitting the chaff to flow out of the chambers of the drum defined by the baffles and drum ends, a higher yield of shelled legumes is achieved. The openings or cutouts of each baffle plate can alternatively comprise a small area for a longer dwell time, or a large area for a shorter dwell time.

According to its major aspects and broadly stated, the present invention in its preferred form is a legume sheller and method of use thereof, the sheller comprising a rotating drum having baffle plates disposed therewithin, wherein the each baffle plate has a truncated pie section removed to form an opening therein. The removed truncated pie sections each comprise approximately 60 to 90 degree cutout openings, and are approximately diametrically disposed from each other; thereby, functioning to retain unshelled legumes within the chambers of the drum for a selected time period. Accordingly, the rate of passage of chaff, and any remaining unshelled legumes, is selectively controlled by varying the surface area for transit through the baffle plate cutout opening, providing the desired dwell time to effectively remove the shells, permitting separation of the shelled legumes from the chaff, and retaining the unshelled legumes within the chambers formed by the baffle plates. By controlling the rate of flow through the drum, higher yields can be achieved with less damage to the legumes.

More specifically, the present invention is a legume sheller and method of use thereof, wherein the legume sheller comprises a drum, loading chute, chaff box, and outlet bin. The drum is rotated at a selected speed and comprises therewithin a tine/rod carrier, a first baffle with a truncated pie-shaped opening, a second baffle with a truncated pie-shaped opening (disposed approximately diametrically opposite the opening in the first baffle), an inlet aperture, an outlet aperture, and separators. A plurality of tines or rods extend from and are secured to the tine/rod carrier, wherein the baffles extend substantially to the inner surface of the drum.

Staggering the baffles such that the openings are approximately diametrically opposite from one another permits the rapid flow of chaff therethrough, while restricting, and thus delaying, passage of unshelled legumes; thereby, permitting adequate time for the highest possible yield of shelled legumes therefrom. Further, the openings can be selectively sized by reducing or enlarging the angle defining the opening to provide different dwell times for different types of legumes, nuts or the like.

Unshelled legumes travel through the drum and are struck by the tines/rods, thereby removing the shell from the legume. The shelled legumes drop into separators disposed around the outside surface of the drum and, as the separators reach the bottom of the drum during rotation, the shelled legumes pass therethrough and out onto a belt. The belt transports the legumes to an outlet bin.

The separator comprises a plurality of winding or tortuous paths having entry and exit openings displaced from one another, wherein the path prevents unshelled legumes and chaff from passing therethrough, yet is readily passable by shelled legumes.

The chaff and unshelled legumes are restricted by the baffles as they are carried through the rotating drum; thereby, permitting adequate dwell time of the unshelled legumes in the sheller drum. Eventually, the chaff travels through the openings in the baffles, and exits from the end of the drum into the chaff box.

Accordingly, a feature and advantage of the present invention is its ability to control the dwell time for material processed within the drum of a legume sheller.

Another feature and advantage of the present invention is its ability to increase the yield of legumes from a legume sheller.

Still another feature and advantage of the present invention is its ability to improve the quality of legumes processed by a legume sheller.

Yet another feature and advantage of the present invention is its ability to reduce damage to legumes processed through a legume sheller.

Yet still another feature and advantage of the present invention is that it provides for easy egress of shelled legumes from a legume sheller.

A further feature and advantage of the present invention is its ability to adjust the dwell time in the sheller by varying the size of the area for passage of legumes through the drum.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which:

FIG. 2 is a cross-sectional end view of baffle and tine carrier components of a sheller according to a preferred embodiment of the present invention;

FIG. 4A is a perspective view of an outlet component of a sheller according to an alternate embodiment of the present invention; and, FIG. 4B is an end view of the outlet component shown in FIG. 4A.

DETAILED DESCRIPTION OF THE PREFERRED AND SELECTED ALTERNATIVE EMBODIMENTS

Figure 1:
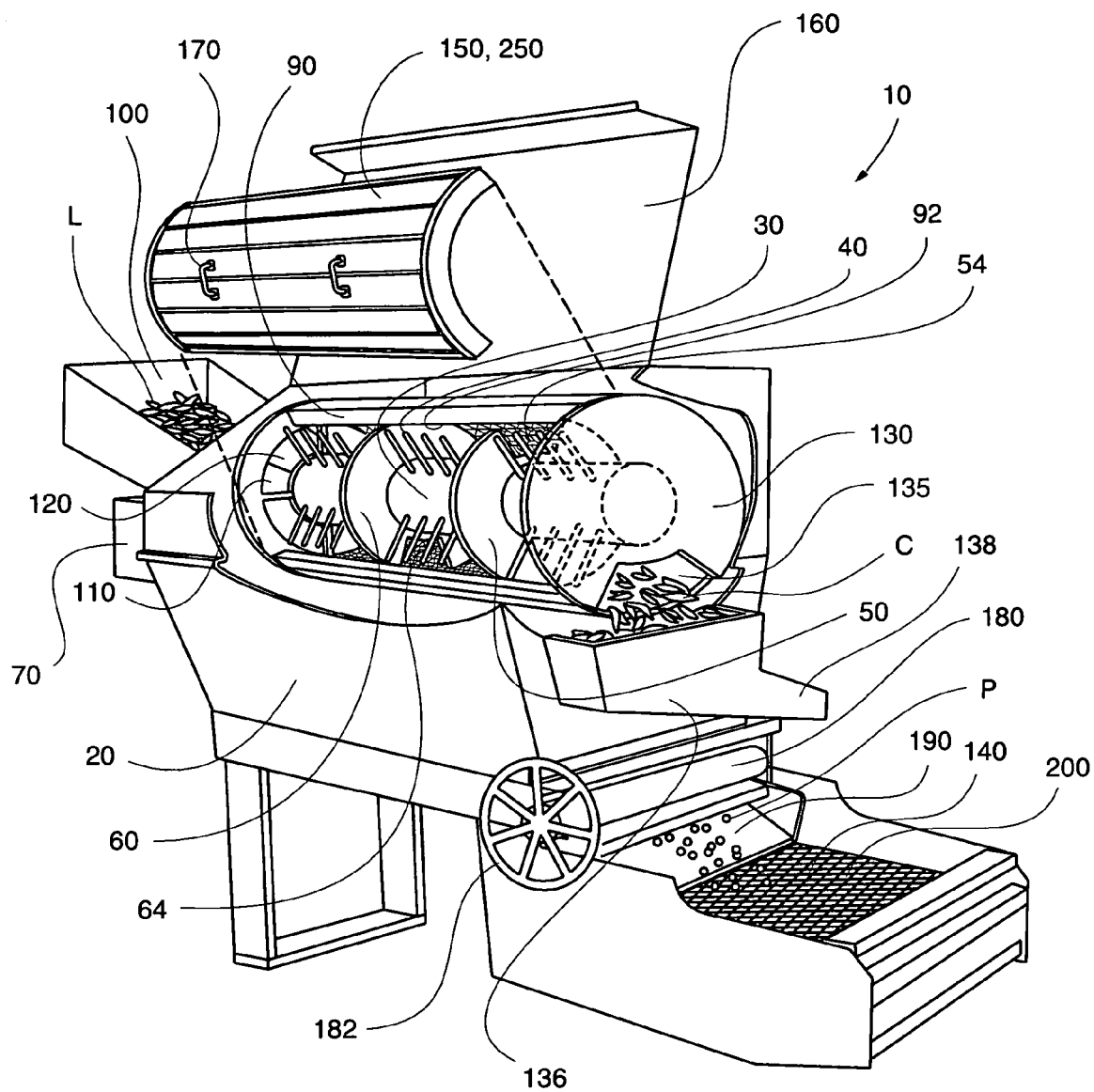
FIG. 1 is a perspective view of a sheller according to a preferred embodiment of the present invention.

In describing the preferred and selected alternate embodiments of the present invention, as illustrated in FIGS. 1-4B, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-3B, the present invention in a preferred embodiment is sheller 10 comprising case 20, motor 70, drum 90, loading chute 100, case cover 160, chaff box 136, outlet bin 140 and belt 180. Outlet bin 140 preferably comprises ramp 190, grate 200 and chaff box 136, wherein chaff box 136 preferably comprises chaff chute 138.

Drum 90 is preferably disposed within case 20 and cover 160, wherein drum 90 is preferably rotated by motor 70 at a selected speed, such as, for exemplary purposes only, two revolutions per minute. Drum 90 preferably comprises tine/rod carrier 30, first baffle 50, second baffle 60, inlet aperture 120, end plate 130, outlet aperture 135, inlet adjusting plate 110 and separator 250. Tines/rods 40 are fixedly-secured to tine/rod carrier 30.

Referring now more specifically to FIG. 2, baffles 50, 60 preferably comprise truncated pie-shaped openings 54, 64, wherein openings 54, 64 are preferably defined by angle 80, and wherein openings 54, 64 are further preferably defined by outer surface 32 of tine/rod carrier 30 and by baffle outer edges 52, 62, and wherein baffle outer edges 52, 62 extend proximate inner surface 92 of drum 90.

Referring now more particularly to FIG. 1, first baffle 50 and second baffle 60 are preferably axially-displaced from one another and fixedly-disposed on tine/rod carrier 30, wherein first baffle 50 is preferably disposed such that opening 54 is approximately diametrically opposed to opening 64 of second baffle 60. It will be recognized by those skilled in the art that openings 54, 64 in baffles 50, 60 could be selectively disposed radially at lesser angles 80 other than diametrically opposed to one another, particularly when utilizing more than two baffles.

Figure 3A:
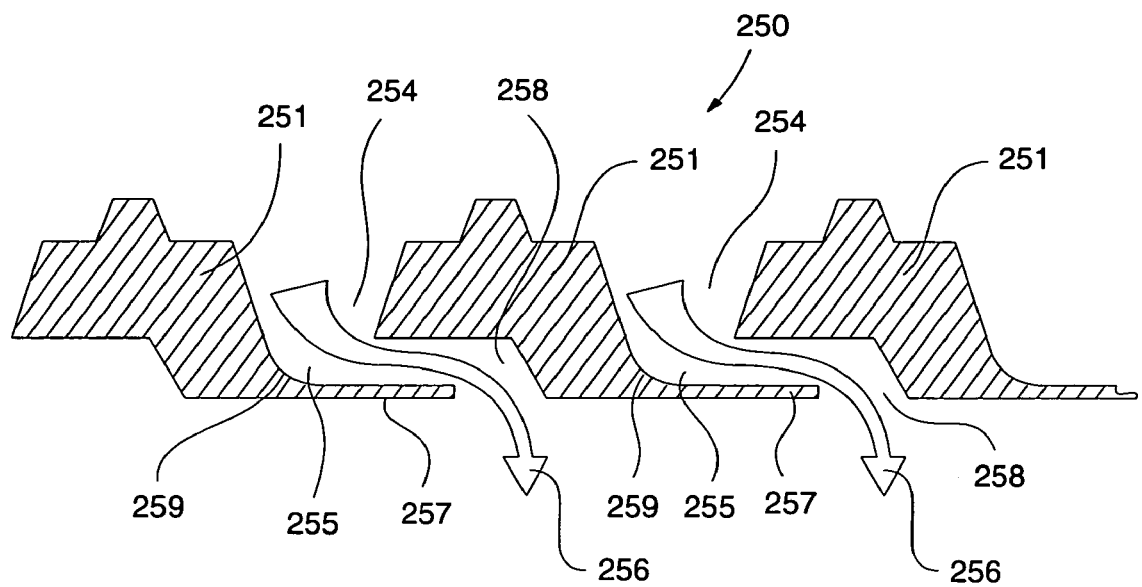
FIG. 3A is a side cutaway view of an outlet component of a sheller according to a preferred embodiment of the present invention.
Figure 3B:
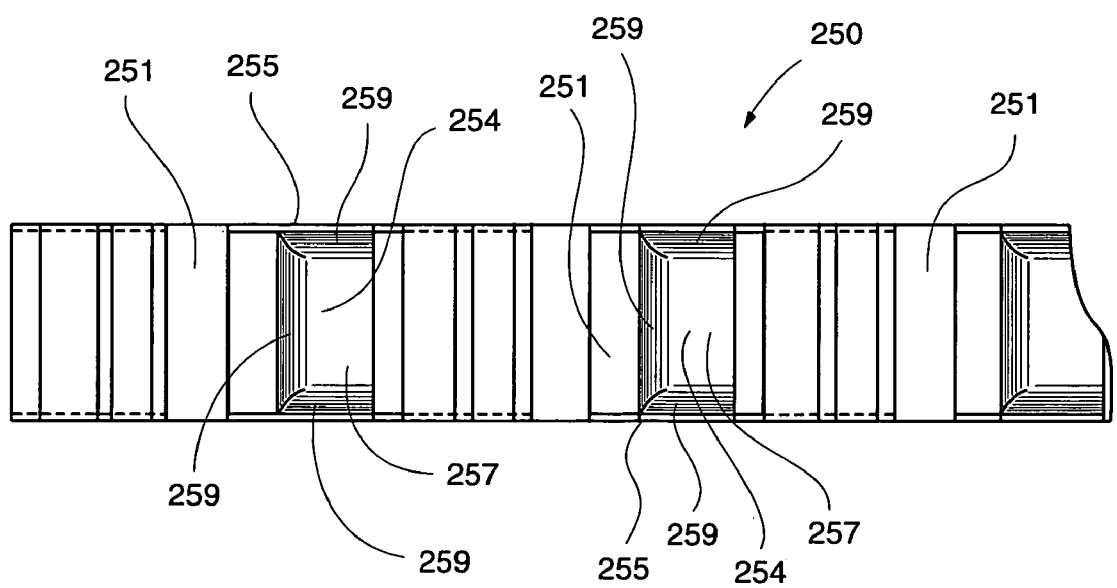
FIG. 3B is a top view of the outlet component shown in FIG. 3A.

Referring now more specifically to FIGS. 3A and 3B, separator 250 preferably comprises openings 254, vanes 255, path 256, blocking plate 257, outlet channel 258 and radii 259, wherein path 256 is preferably too winding or tortuous for passage of unshelled legumes L and/or chaff C, and wherein path 256 is preferably readily passable by shelled legumes P.

Radii 259 are preferably disposed on vanes 255 and blocking plate 257, wherein radii 259 preferably prevent buildup of juices of shelled legumes P within path 256. If juices of shelled legumes P are allowed to build up in path 256, chaff C will adhere to vanes 255 and/or blocking plate 257, thereby blocking path 256. Further, radii 259 facilitate cleaning of path 256 by eliminating sharp angles where chaff C could gather.

Referring now more specifically to FIGS. 4A and 4B, illustrated therein is an alternate embodiment of separator 250, wherein the alternate embodiment of FIGS. 4A and 4B is substantially equivalent in form and function to that of the preferred embodiment detailed and illustrated in FIGS. 3A and 3B except as hereinafter specifically referenced. Specifically, the embodiment of FIGS. 4A and 4B comprises separator 150, wherein separator 150 comprises body 152, openings 154, vanes 155, path 156, blocking plate 157 and outlet channel 158, and wherein path 156 is too winding or tortuous for passage of unshelled legumes L and/or chaff C, and wherein path 156 is readily passable by shelled legumes P.

In use, motor 70 preferably drives drum 90, wherein tine/rod carrier 30 is in fixed communication with drum 90, thereby concurrently rotating baffles 50, 60 and tines/rods 40 within drum 90 as drum 90 rotates. Unshelled legumes L are preferably introduced to loading chute 100, wherein unshelled legumes L preferably pass through inlet aperture 120. Inlet aperture 120 of drum 90 is preferably selectively constricted by application of inlet adjusting plate 110, wherein closing inlet adjusting plate 110 preferably reduces the quantity of unshelled legumes L passed into sheller 10. It will be recognized by those skilled in the art that drum 90 and tine/rod carrier 30 could be independent, wherein either could be fixed while the other rotates, or alternately, either could rotate independently.

Subsequent to introduction of unshelled legumes L into drum 90 via inlet aperture 120, unshelled legumes L rotate within drum 90, while drum 90 is rotated by motor 70. Movement of unshelled legumes L within drum 90 causes unshelled legumes L to impact on tines/rods 40, wherein shelled legumes P are released, therein leaving chaff C free to continue travel within drum 90. Shelled legumes P drop under gravity and/or centrifugal force into separator 150 or 250 respectively, wherein shelled legumes P enter openings 154 or 254, travel via path 156 or 256 and exit separator 150 or 250 via outlet channel 158 or 258, and fall onto belt 180. Belt 180 is preferably driven by motor 70, thereby carrying shelled legumes P to ramp 190, wherein shelled legumes P are deposited onto grate 200 of outlet bin 140. Shelled legumes P fall through grate 200 into outlet bin 140 Any small pieces of chaff C that have passed through separator 150 or 250 are retained on grate 200 for subsequent removal. It will be recognized by those skilled in the art that belt 180 can be rotated by wheel 182, in lieu of motor 70, when it is desired to have intermittent output of shelled legumes P into outlet bin 140.

Although shelled legumes P can pass through separator 150 or 250 via path 156 or 256, respectively, unshelled legumes L and/or chaff C cannot traverse path 156 or 256 because of its winding or tortuous nature. Unshelled legumes L and/or chaff C that enter openings 154 in body 152 of separator 150 are impeded by vanes 155 and blocking plate 157, thereby preventing passage of unshelled legumes L and/or chaff C through separator 150. Similarly, for separator 250, unshelled legumes L and/or chaff C entering openings 254 of separator 250 are impeded by vanes 255 and blocking plates 257. As drum 90 is rotated, unshelled legumes L and chaff C that have entered openings 154 fall out of openings 154 under gravitational force, thereby clearing path 156 for subsequent traverse by shelled legumes P.

Unshelled legumes L and chaff C travel through drum 90 from inlet aperture 120 passing first baffle 50 and second baffle 60 to end plate 130, wherein hulls/pods/shells C and any residual unshelled legumes/nuts L pass through outlet aperture 135 and into chaff box 136. Subsequently, hulls/pods/shells C pass out of chaff box 138 via chaff chute 138.

As unshelled legumes L travel through drum 90, they are obstructed by first baffle 50 until they arrive at opening 54, wherein unshelled legumes L then pass through opening 54 and continue travel until they are once again obstructed by second baffle 60. Once unshelled legumes L have an opportunity to pass through opening 64, they are then free to travel to end plate 130 and outlet aperture 135. Positioning of openings 54, 64 diametrically opposite one another prevents the rapid passage of unshelled legumes L through drum 90, wherein unshelled legumes L, after passing opening 54, must migrate approximately 180 degrees around drum 90 before they can pass opening 64. Close proximity of baffles 50, 60 to inner surface 92 of drum 90, prevents migration of unshelled legumes L and/or chaff C from premature passage across baffles 50, 60.

In the preferred embodiment, angle 80 comprises approximately 60 to 90 degrees. Angle 80 in openings 54, 64 is selected to adjust the length of travel time of unshelled legumes L through drum 90, wherein a larger opening 54, 64 formed by a larger angle 80 will result in a shorter travel time, and wherein a smaller opening 54, 64 formed by a smaller angle 80 will result in a longer travel time. It will be recognized by those skilled in the art that varying the travel time within drum 90 to accommodate the physical properties of different types of unshelled legumes L will permit attainment of a superior yield of shelled legumes P.

In an alternate embodiment of the present invention, it is contemplated that any selected number of baffles could be utilized with openings therein having an area selected to maintain a similar dwell time to that achieved with use of baffles 50, 60 alone.

In another alternate embodiment of the present invention, it is contemplated that baffles 50, 60 could be disposed at any angle between 0 and 180 degrees from one another.

In yet another alternate embodiment of the present invention, it is envisioned that baffles 50, 60 could be fixed to drum 90 and non-rotating.

In still yet another alternate embodiment of the present invention, it is contemplated that baffles 50, 60 could comprise more than one opening formed therein.

In still a further alternate embodiment of the present invention, it is contemplated that a single baffle could be utilized.

In yet another alternate embodiment of the present invention, it is envisioned that openings 54, 64 could have different shapes than pie-shaped, wherein openings 54, 64 could comprise, for exemplary purposes only, partial circular or rectangular openings.

In yet still a further alternate embodiment of the present invention, it is contemplated that openings 54, 64 could be adapted to be variable to reduce or enlarge angle 80, such as via a sliding door/window similar to inlet adjusting plate 110 in inlet aperture 120.

In yet still another alternate embodiment of the present invention, it is envisioned that baffles 52, 62 could be selectively rotatable.

In yet still a further additional alternate embodiment of the present invention, it is envisioned that baffles 52, 62 could be removable.

In still another alternate embodiment of the present invention, sheller 10 can be utilized for scaling fish, wherein baffles 52, 62 delay the passage of fish through drum 90, wherein tines/rods 40 are removed, and wherein separators 150, 250 are replaced with a scaling means, such as, for exemplary purposes only, expanded metal.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A sheller comprising:
    a rotatable drum having a baffle plate disposed therewithin, wherein said baffle plate comprises an opening formed therethrough; and
    at least one other baffle plate comprising a second opening formed therethrough, wherein said opening in said baffle plate is disposed approximately diametrically opposite said second opening in said at least one other baffle plate.

2. The sheller of claim 1, wherein said drum comprises an inner surface, and wherein at least a portion of said baffle plate extends to said inner surface of said drum.

3. The sheller of claim 1, further comprising tines disposed on a tine carrier.

4. The sheller of claim 1, further comprising a tortuous path, wherein said tortuous path is adapted to prevent unshelled legumes and chaff materials from passage therethrough.

5. The sheller of claim 4, wherein shelled legumes exit said sheller via said tortuous path.

6. The sheller of claim 5, wherein said tortuous path comprises radius curves.

7. A sheller comprising:
    a rotatable drum having a baffle plate disposed therewithin, wherein said baffle plate comprises an opening formed therethrough; and
    at least one other baffle plate comprising a second opening formed therethrough, wherein said openings comprise a truncated pie-shape.

8. A sheller comprising:
    a rotatable drum having a baffle plate disposed therewithin, wherein said baffle plate comprises an opening formed therethrough; and
    at least one other baffle plate comprising a second opening formed therethrough, wherein said openings comprise an angle of approximately 60 to 90 degrees.

9. A sheller comprising:
    a rotatable drum having a baffle plate disposed therewithin, wherein said baffle plate comprises an opening formed therethrough, wherein said opening further comprises an adjusting plate, and wherein said opening is expanded or reduced via said adjusting plate.

10. A sheller comprising:
    a rotatable drum having a baffle plate disposed therewithin, wherein said baffle plate comprises an opening formed therethrough, further comprising at least one additional opening in said baffle plate, and wherein said baffle plate is connected to said tine carrier, and wherein said baffle plate rotates with rotation of said tine carrier.

11. A method of shelling legumes, said method comprising the steps of:
    a. filling a legume sheller with unshelled legumes;
    b. rotating a drum of said legume sheller, wherein the unshelled legumes are separated from their shells;
    c. impeding the flow of the unshelled legumes by a first baffle plate having a first opening formed therein; and
    d. disposing a second opening in a second baffle plate approximately diametrically opposite from said first opening in said first baffle plate.

12. The method of claim 11, wherein said step of filling further comprises the step of:
    loading the unshelled legumes via an inlet aperture.

13. The method of claim 11, further comprising the step of:
    unloading chaff from said legume sheller via an outlet aperture.

14. The method of claim 11, further comprising the step of:
    unloading shelled legumes from said legume sheller via a separator.

15. The method of claim 14, further comprising the step of:
    permitting shelled legumes to pass through a separator comprising a tortuous path to prevent unshelled legumes and chaff from passing therethrough.

16. A legume sheller apparatus comprising:
    a rotatable drum having a plurality of baffle plates therein, wherein each of said baffle plates comprises an opening formed therein, wherein said openings in said plurality of baffle plates are disposed radially away from one another.

* * * * *